(12) United States Patent
Kudoh (10) Patent No.: US 8,287,193 B2
(45) Date of Patent: Oct. 16, 2012

(54) IMAGE STABILIZING APPARATUS AND IMAGING APPARATUS INCLUDING IMAGE STABILIZING APPARATUS

(75) Inventor: Tomoyuki Kudoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/984,512

(22) Filed: Jan. 4, 2011

(65) Prior Publication Data

US 2011/0164869 A1 Jul. 7, 2011

(30) Foreign Application Priority Data

Jan. 6, 2010 (JP) ................................. 2010-001196

(51) Int. Cl.
*G03B 5/02* (2006.01)
*G03B 17/00* (2006.01)
(52) U.S. Cl. ......................................... 396/349; 396/55
(58) Field of Classification Search .................... 396/55, 396/349; 359/557; 348/208.99, 208.4, 208.7, 348/208.11
See application file for complete search history.

(56) References Cited

U.S. PATENT DOCUMENTS 6,035,131 A 3/2000 Washisu
2008/0232789 A1* 9/2008 Otsuka ............................ 396/55

FOREIGN PATENT DOCUMENTS

JP 9-033975 A 2/1997
JP 2007-140339 A 6/2007

OTHER PUBLICATIONS

U.S. Appl. No. 12/949,011, filed Nov. 18, 2010.
U.S. Appl. No. 12/848,932, filed Aug. 2, 2010.
U.S. Appl. No. 12/846,578, filed Jul. 29, 2010.
U.S. Appl. No. 12/681,368, filed Apr. 1, 2010.
U.S. Appl. No. 12/681,364, filed Apr. 1, 2010.

* cited by examiner

*Primary Examiner* — Clayton E Laballe
*Assistant Examiner* — Noam Reisner
(74) *Attorney, Agent, or Firm* — Canon U.S.A., Inc. IP Division (57) ABSTRACT

An apparatus included in a lens barrel, includes a base member, a first lens unit which is movable in a direction perpendicular to an optical axis of the first lens, a second lens unit, attached to the first lens unit, and movable in a direction perpendicular to an optical axis of the second lens, and a plurality of rolling members sandwiched between the base member and the first lens unit, wherein a gap between the first lens unit and the second lens unit is adjustable, and wherein the gap between the first lens unit and the second lens unit is smaller and a gap between the first lens unit and the base member is larger in the photographable state as compared to the retracted state, and the rolling members do not contact the base member or the first lens unit in the retracted state.

12 Claims, 11 Drawing Sheets

IMAGE STABILIZING APPARATUS AND IMAGING APPARATUS INCLUDING IMAGE STABILIZING APPARATUS

BACKGROUND OF THE INVENTION

1. Field of the Invention

The present invention relates to a configuration of a lens group used in an image stabilizing apparatus.

2. Description of the Related Art

Conventionally, there are digital cameras that include a zoom mechanism for changing photographing magnification by moving a plurality of optical lenses in an optical axis direction.

Such a zoom mechanism employs a cam ring to move in the optical axis direction a plurality of lens holding units that hold the plurality of lenses. Further, the zoom mechanism employs a rotation regulating unit to regulate the lens holding units from moving in a rotational direction. The optical lenses can thus be moved to a designated position by such a configuration.

Furthermore, rapid development of high magnification digital cameras has led to an increase in a number of lens groups and a total extended lens length, so that the size of the cameras has become larger. Moreover, there is a strong demand for thinner cameras, which requires the size of the lens to be thin when retracted in the camera.

The digital camera may be thinned by shortening the length of each lens barrel in the optical axis direction and connecting the lens barrels in a multistage configuration. However, since there are numerous restrictions on arranging a plurality of cams without intersecting, such a configuration is difficult to realize.

Further, gaps between the lenses within one lens group may become wide depending on an optical design of the lenses. As a result, the thickness of the camera increases due to such gaps.

To solve the above-described situations, Japanese Patent Application Laid-Open No. 2007-140339 discusses a method for changing, in a lens barrel that extends and retracts by moving a plurality of lens groups, the gaps between the lenses in the lens group held by a barrel frame. As a result, the gap between the lenses in the lens group is reduced, and the total thickness of the camera decreases.

On the other hand, a number of cameras including a correction control function for correcting the image blur caused by a camera shake has been recently developed. The image stabilizing function detects an amount of camera shake using a gyro sensor, and a correction lens is then moved by an assumed correction amount to compensate for camera vibration.

For example, Japanese Patent Application Laid-Open No. 9-33975 discusses a mechanical configuration of the image stabilizing function which includes a lens holder configured by mounting the correction lens on balls. The correction lens is rolled on the ball, so that the correction lens can be smoothly moved.

However, the gap between the lenses in the camera shake correction lens discussed in Japanese Patent Application Laid-Open No. 9-33975 may become wide, so that the camera thickness is increased. The technique discussed in Japanese Patent Application Laid-Open No. 2007-140339 may be directly applied to the configuration discussed in Japanese Patent Application Laid-Open No. 9-33975 that includes the image stabilizing apparatus, to decrease the thickness of the camera. In such a case, unnecessary force may be applied to and thus scratch the balls or a ball receiving surface, so that the image stabilizing correction performance may become degraded.

SUMMARY OF THE INVENTION

According to an aspect of the present invention, an apparatus included in a lens barrel that moves between a photographable state and a retracted state, the apparatus includes a base member, a first lens unit which holds a first lens and is movable in a direction perpendicular to an optical axis of the first lens, a second lens unit which holds a second lens, is attached to the first lens unit, and is movable in a direction perpendicular to an optical axis of the second lens, and a plurality of rolling members sandwiched between the base member and the first lens unit, wherein a gap between the first lens unit and the second lens unit is adjustable, and wherein the gap between the first lens unit and the second lens unit is smaller and a gap between the first lens unit and the base member is larger in the photographable state as compared to the retracted state, and the rolling members do not contact the base member or the first lens unit in the retracted state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

The drawings to be described below are schematic drawings, and the size and shape of each portion are exaggeratingly illustrated as appropriate for ease of understanding. Further, specific numerical values, shapes, and operations described below can be changed as appropriate.

Furthermore, to clarify the correspondence between each of the diagrams for ease of understanding, an XYZ orthogonal coordinates are set as a coordinate system for simply indicating directions without particularly defining an origin. An upper direction when the camera is set in a normal position is defined as a Y-positive direction.

The above-described normal position indicates a posture of the camera in which the optical axis of an image capturing optical system of the lens barrel is horizontal, and a longitudinal direction of an image capturing screen is a horizontal direction. Hereinafter, the Y-positive direction is defined as the upward direction, and a Z-positive direction (i.e., a direction towards the object along the optical axis) is defined as the front.

Figure 1A:
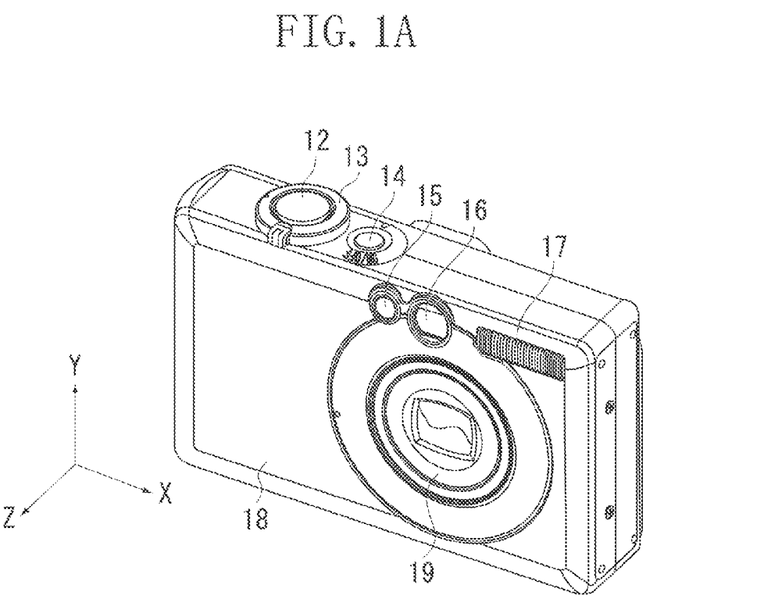
FIGS. 1A and 1B are perspective views illustrating an imaging apparatus including an image stabilizing apparatus when a lens barrel is in a retracted state and when the lens barrel is in a photographable state respectively, according to a first exemplary embodiment of the present invention.
Figure 1B:
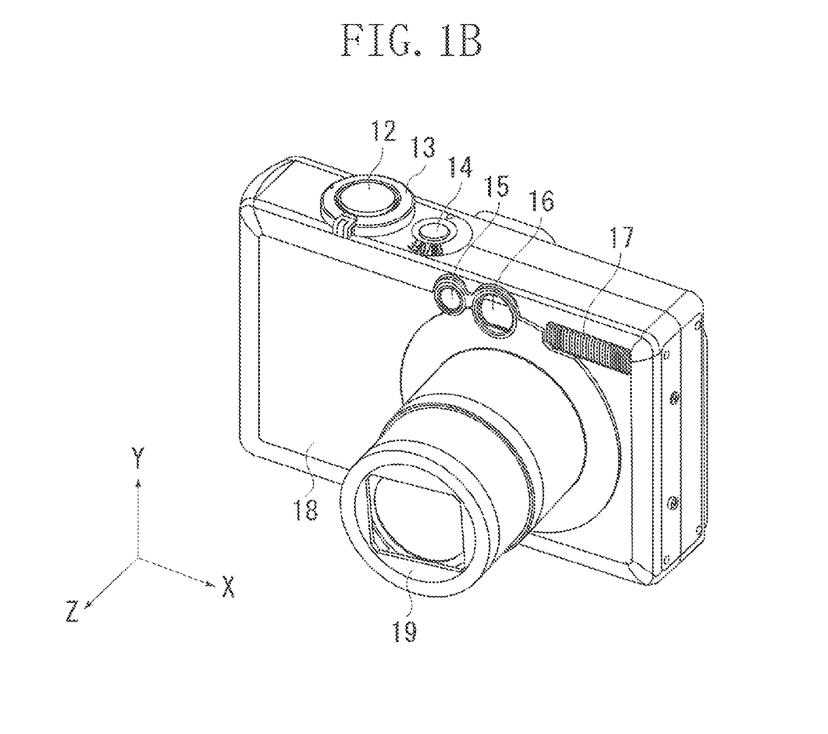
Figure 2:
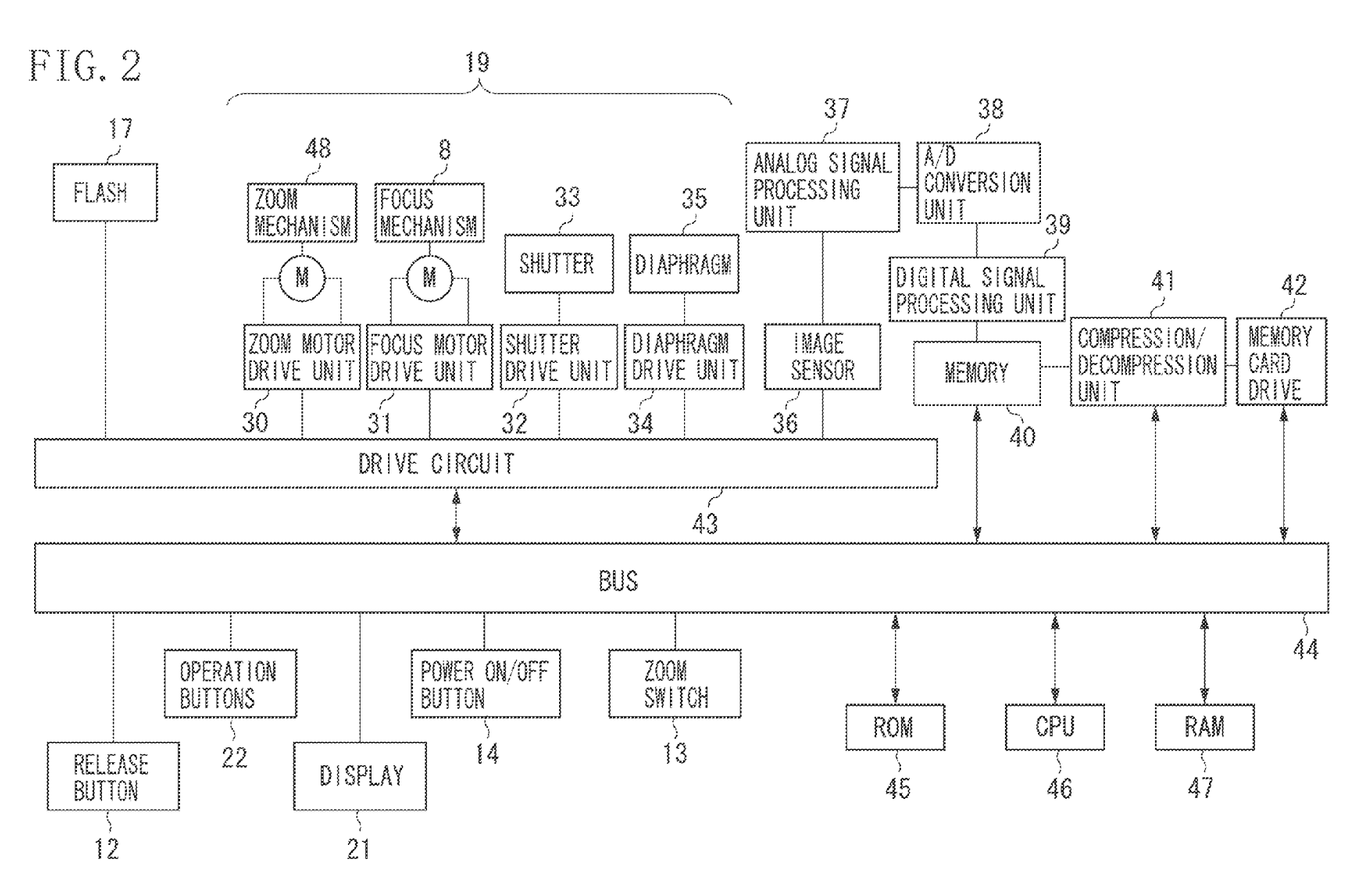
FIG. 2 is a block diagram illustrating a main portion of the imaging apparatus including the image stabilizing apparatus according to an exemplary embodiment of the present invention.

FIG. 1A is an external perspective view of a digital camera 18, i.e., an imaging apparatus, including an image stabilizing apparatus, in a power-off state according to the first exemplary embodiment of the present invention. FIG. 1B is an external perspective view of the digital camera 18 in a power-on state. FIG. 2 is a block diagram illustrating the digital camera 18. FIGS. 1A, 1B, and 2 are representative schematic diagrams of a camera, and the present invention is not limited to the above-described configuration.

Referring to FIGS. 1A and 1B, a lens barrel 19 including a photographing lens whose focal length can be changed, and a viewfinder window 16, are disposed on a front surface of the digital camera 18 (hereinafter referred to as the camera 18). A lens barrier device (illustrated is a closed state in FIG. 1A and an open state in FIG. 1B), which opens and closes an optical path of the photographing lens according to the camera being switched on and off, is included in a front portion of the lens barrel 19.

Further, an auxiliary light window 15 which is an auxiliary light source for performing photometry and range-finding, and a light emitting window 17 which is a flash unit for irradiating an object with illumination light, are disposed on a top surface of the camera 18. Furthermore, a release button 12 is disposed on the top surface of the camera 18. The release button 12 is used to start an image capturing preparation operation (i.e., focusing operation and photometric operation) and an image capturing operation (i.e., exposure onto the film or an image sensor such as a charge-coupled device (CCD)). Moreover, a zoom switch 13 for changing the focal length by driving a zoom lens, and a power on/off button 14 are disposed on the top surface of the camera 18.

A tripod mounting unit (not illustrated), a memory card drive 42 (illustrated in FIG. 2) in which a memory card, i.e., a storage medium, is to be inserted, and a card battery cover (not illustrated) having a battery inserting portion inside, are disposed on a bottom surface of the camera 18.

Operation buttons are disposed on a back surface of the camera 18 to be used for switching various functions. There is no particular limit to the number of operation buttons 22. Further, buttons are not a limitation, and any configuration that can realize similar functions may be used, such as sticks, dials, and a touch panel.

Furthermore, a display 21 (illustrated in FIG. 2) and an eye-side finder unit are disposed on the back surface of the camera 18. The display 21 is an image display unit that displays image data stored in the memory or read from the memory card.

Referring to FIG. 2, a control unit in the camera 18 includes a central processing unit (CPU) 46, a read-only memory (ROM) 45, and a random access memory (RAM) 47. Various elements such as the release button 12, the operation buttons 22, the display 21, the memory 40, and the memory card drive 42 are connected to the control unit via a bus 44.

A drive circuit 43 connected to the control unit via the bus 44 is also connected to a zoom motor drive unit 30, a focus motor drive unit 31, a shutter drive unit 32, and a diaphragm drive circuit 34. Each of the drive units is controlled by a signal output from the control unit. Further, an image sensor 36 such as a CCD sensor or a complementary metal-oxide sensor semiconductor (CMOS) sensor, and a flash 17 are connected to the control unit, which controls driving of each unit by outputting signals.

The ROM 45 stores programs to control each of the above-described functional elements. The RAM 47 stores data for executing each of the control programs. An analog signal processing unit 37 performs analog processing on the read image data, and outputs the result to an analog/digital (A/D) conversion unit 38.

The A/D conversion unit 38 converts the read analog data to digital data, and outputs the digital data to a digital signal processing unit 39, which processes the digital data. The digital data is then stored in the memory 40.

A compression/decompression unit 41 performs compression, such as Joint Photographic Experts Group (JPEG) and Tag Image File Format (TIFF), on the data stored in the memory 40, according to a user operation on the operation buttons 22. The processed data is output to and stored in the memory 40. The compression/decompression unit 41 then performs decompression of the image data stored in the memory 40 or the memory card drive 42, and causes the image data to be displayed on the display 21 via the bus 44.

The user can view the data on the display 21, and if the user determines that the image is unnecessary, the user can delete the data by operating the operation buttons 22.

Figure 3:
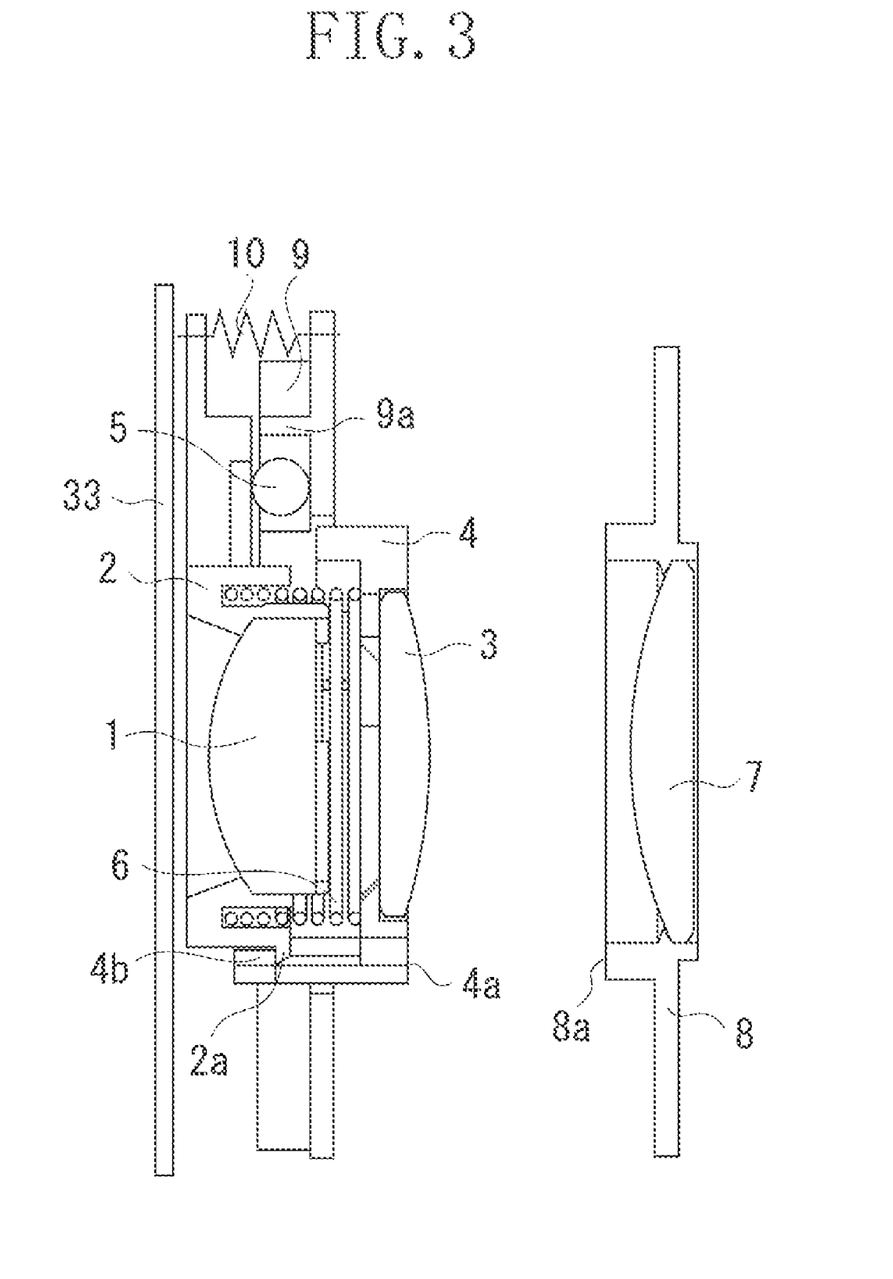
FIG. 3 is a cross-sectional view of the image stabilizing apparatus when the lens barrel in the imaging apparatus is in a photographable state according to the first exemplary embodiment of the present invention.
Figure 4:
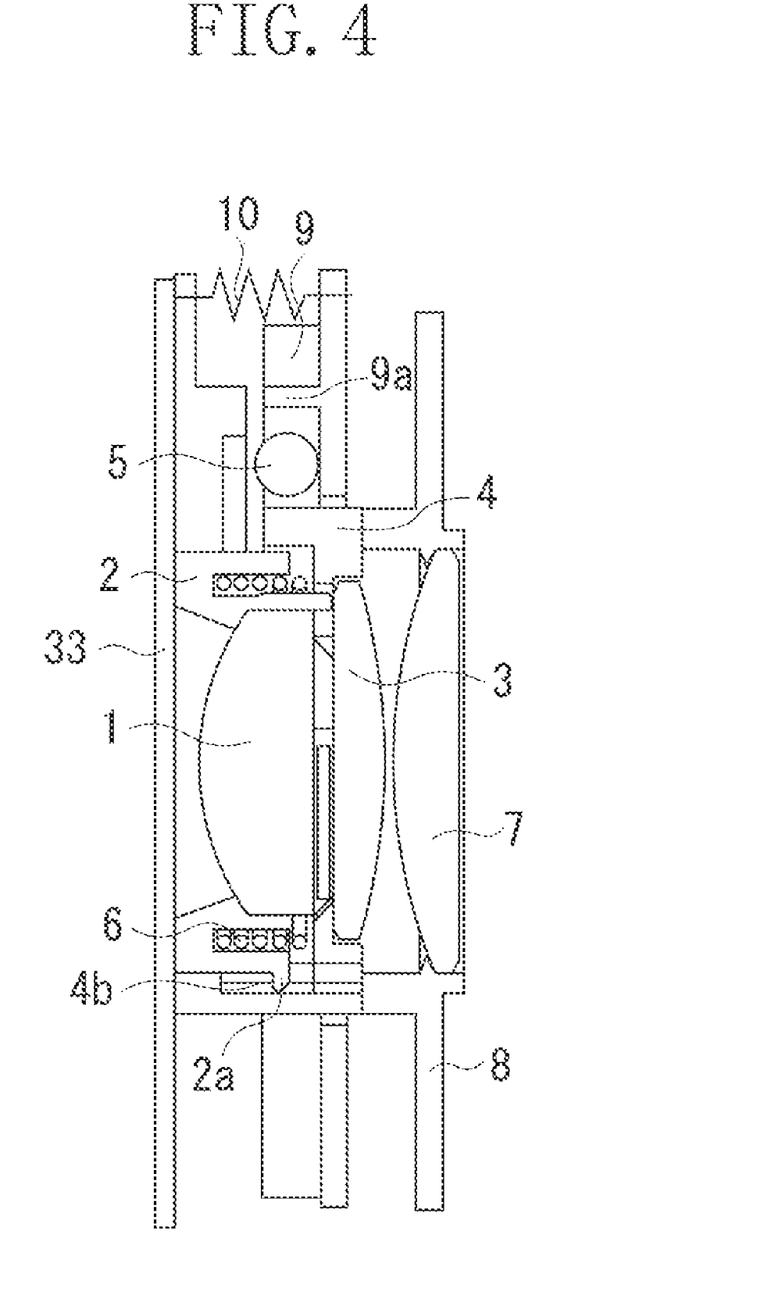
FIG. 4 is a cross-sectional view of the image stabilizing apparatus when the lens barrel in the imaging apparatus is in a retracted state according to the first exemplary embodiment of the present invention.
Figure 5:
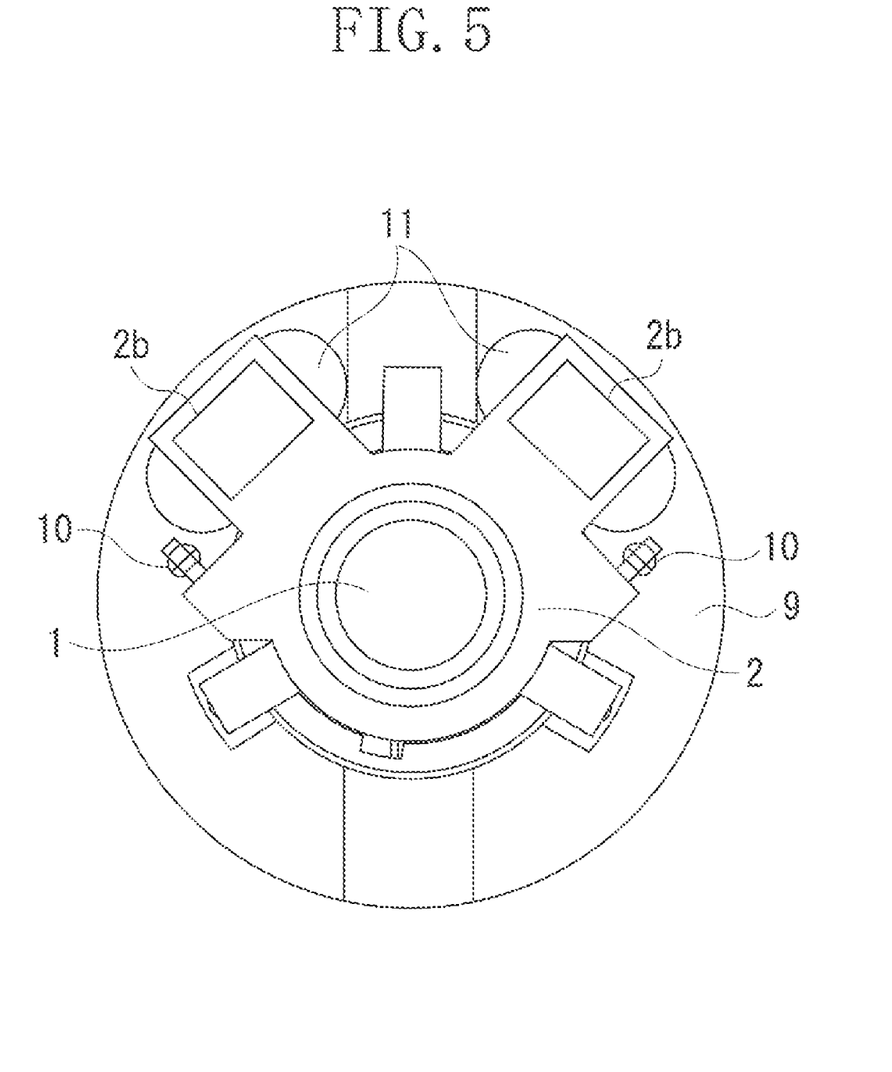
FIG. 5 is a front view of the image stabilizing apparatus according to the first exemplary embodiment of the present invention.
Figure 6:
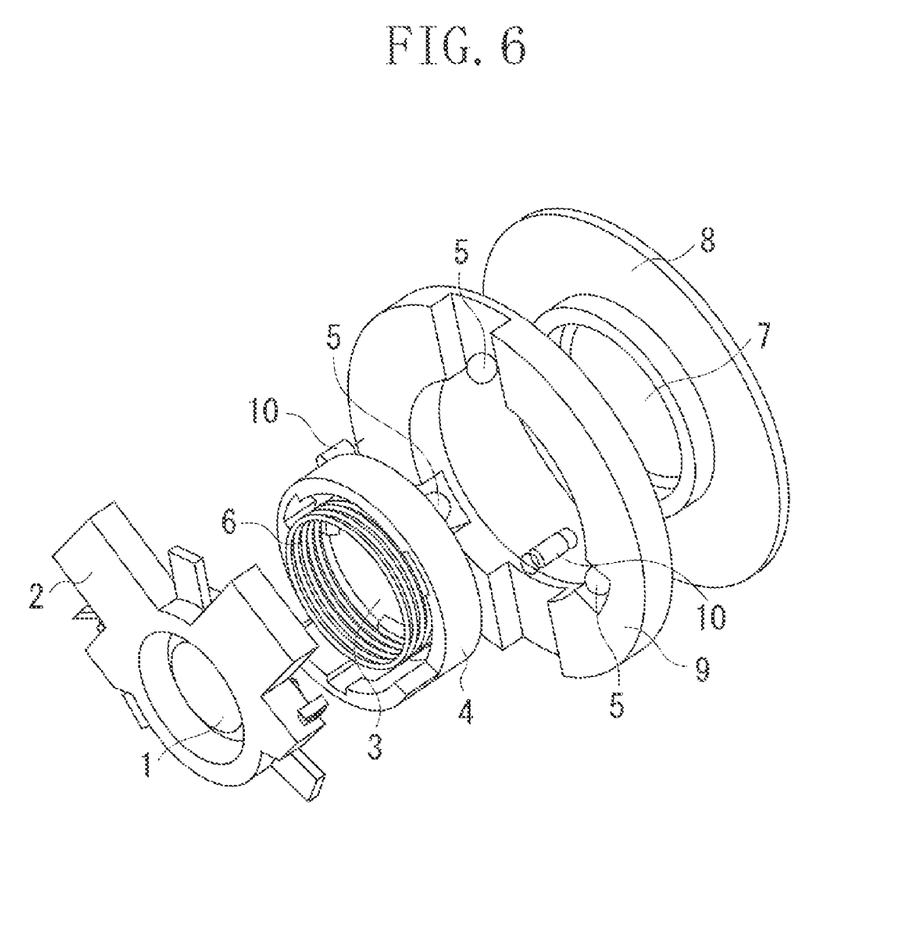
FIG. 6 is an exploded perspective view illustrating the image stabilizing apparatus according to the first exemplary embodiment of the present invention.

The image stabilizing apparatus, which is a portion of the lens barrel 19 included in the camera 18 according to the present exemplary embodiment, will be described below. FIG. 3 is a cross-sectional view illustrating the image stabilizing apparatus when the camera is in a used state (i.e., the lens barrel 19 is in the photographable state). FIG. 4 is a cross-sectional view illustrating the image stabilizing apparatus when the camera is in an unused state (i.e., the lens barrel 19 is in the retracted state). FIG. 5 is a front view, and FIG. 6 is an exploded perspective view illustrating the image stabilizing apparatus in the camera 18, respectively.

Referring to FIGS. 3, 4, 5, and 6, an image stabilizing mechanism according to the present exemplary embodiment includes in an order from an object side (z-positive side)

along the optical axis, a first lens holding member 2 (i.e., a first lens unit), a base member 9, and a second lens unit holding member 4 (i.e., a second lens unit). The first lens holding member 2 (i.e., a first lens unit) and the second lens unit holding member 4 (i.e., a second lens unit) are movable with respect to the base member 9 in a direction perpendicular to the optical axis. The image stabilizing mechanism is supported by a driving mechanism (not illustrated) (e.g., a follower and a cam), and the entire mechanism moves in the optical axis direction according to a zoom operation and a retract operation.

The first lens holding unit 2 locks and holds the first lens 1. Further, referring to FIG. 5, magnets 2*b* are fixed on the first lens holding unit 2 at positions opposing coil units 11 on the base member 9 to be described below. The two magnets 2*b* are magnetized in a direction perpendicular to each other.

Furthermore, hall elements (not illustrated) as position detection units are disposed in positions opposing the magnets 2*b*. Each of the hall elements detect movements of the first holding member 2 as a change in a magnetic field, and displacement is then calculated based on the change amount. Since positional accuracy of the magnets and the hall elements is important, the fall elements are to be accurately positioned.

The base member 9 is a base unit of the image stabilizing mechanism. There is an opening at the center of the base member 9, and the two coil units 11 each including a coil and a bobbin are fixed on the base member 9.

The coil units 11, the magnets 2*b*, and the hall elements form one set, and two of such sets are used as an actuator and a position detection unit of the first lens holding member 2 when stabilizing the image. Further, balls 5, i.e., rolling members, are disposed in three positions on a front side of the base member 9. The first lens folding member 2 is disposed to sandwich the balls 5 with the base member 9.

Furthermore, a spring 10 (i.e., a second biasing member) are latched and bridged over the base member 9 and the first lens holding member 2. The first lens holding member 2 is thus biased towards the base member 9 by the spring 10, i.e., the biasing member. According to the present exemplary embodiment, the spring 10 is a tension spring. However, any spring may be used as long as the first lens holding member 2 is biased towards the base member 9.

The first lens holding member 2 is pressed against the base member 9 via the balls 5 and is movable in the direction perpendicular to the optical axis. The first lens holding member 2 can thus compensate for the camera shake by moving the object image on an imaging plane. Ball holding units 9*a* are formed on the base member 9 to prevent the balls 5 from falling out. The balls 5 are non-magnetic ceramic balls, and the first lens holding member 2 and the second lens holding member 4 are stably held by using at least three balls 5.

The ball holding units 9*a* may be formed by digging grooves in the base member 9, or regulating members may be formed surrounding a movable range of the balls 5. According to the present invention, the ball holding units 9*a* are formed on the base member 9. However, the ball holding units 9*a* may be formed only on the first lens holding member 2, or on both the base member 9 and the first lens holding member 2.

The second lens holding member 4 locks and holds a second lens 3 similarly as the first lens holding member 2. The first lens holding member 2 and the second lens holding member 4 are connected by the first connecting unit 2*a* of the second lens holding member 4 abutting a second connecting unit 4*b* of the second lens holding member 4. The first lens holding member 2 and the second lens holding member 4 are thus approximately integrated to be movable in the optical axis direction.

The first lens holding member 2 and the second lens holding member 4 may be connected using a bayonet connection. When the camera 18 is in the image capturing state, the first connecting unit 2*a* and the second connecting unit 4*b* are in contact with each other as illustrated in FIG. 1. The gap between the first lens holding member 2 and the second lens holding member 4 is thus determined.

A spring 6, i.e., a first biasing member, is disposed between the first lens holding member 2 and the second lens holding member 4. The spring 6 applies a force in a direction to widen the gap between the first lens holding member 2 and the second lens holding member 4. According to the present exemplary embodiment, the spring 6 is a compression spring.

When the camera 18 is being used by the user (i.e., in the photographable state), an electric current is applied to the coil unit 11 to generate magnetic force by the above-described configuration. The first lens holding member 2 is then moved within the plane to reduce and correct the image-shake on the image sensor. Further, the second lens holding member 4 relatively moves together with the movement of the first lens holding member 2 and can perform image stabilizing.

A focus lens holding member 8 (i.e., a third lens unit) which holds a focus lens 7 (i.e., a third lens) is disposed in the image sensor side along the optical axis direction of the second lens holding member 4. When the user switches off the camera 18, the state of the camera 18 is shifted from the state of being used (photographable state) to the unused state (retracted state). In such a case, the base member 9 moves towards a retracting direction, i.e., towards the image sensor side along the optical axis direction. A contact portion 8*a*, which is integrally formed on the focus lens holding member 8, then comes into contact with a lens storing unit 4*a* on the second lens holding member 4.

If a load applied on the spring 6 is set to be less than the load applied on the spring 10, the lens storing unit 4*a* on the second lens holding member 4 is pressed by the contact portion 8*a*. As a result, the second lens holding member 4 moves towards a direction to decrease the gap between the second lens holding member 4 and the first lens holding member 2.

When the gap between the second lens holding member 4 and the first lens holding member 2 decreases, the contact between the first lens holding member 2 and the balls 5 is released. Even in the case where the contact is not released, the balls 5 apply less pressure on the base member 9 and the first lens holding member 2, as compared to when the camera 18 is being used (i.e., in the photographable state).

Further, when the camera 18 is not being used (i.e., the lens barrel is retracted), the first lens holding member 2 may come into contact with a regulating member that regulates a retracted lens position (such as the zoom mechanism 33). The first lens holding member 2 may then be held in the position. As a result, the photographing lens barrel can be thinned by decreasing, when the camera 18 is not being used (i.e., the lens barrel is retracted), the gap between the first lens holding member 2 and the second lens holding member 4.

Furthermore, unnecessary force is not applied to the balls 5, the ball receiving surfaces of the first lens holding member 2, and the base member 9. Sliding surfaces are thus prevented from being scratched.

On the other hand, if the load applied to the spring 6 is set to be greater than the load applied to the spring 10, the lens storing unit 4*a* is pressed by the contact portion 8*a*. The first lens holding member 2 and the second lens holding member 4 are moved together towards the object side along the optical axis direction. The contact between the first lens holding member 2 and the balls 5 is then released.

Even in the case where the contact is not released, the balls 5 apply less pressure on the base member 9 and the first lens holding member 2 as compared to when the camera 18 is being used (i.e., in the photographable state). The first lens holding member 2 then comes into contact with the regulating member (e.g., the zoom mechanism 33) and held in the position. The gap between the first lens holding member 2 and the second lens holding member 4 thus decreases, and the lens barrel can be thinned.

Figure 7:
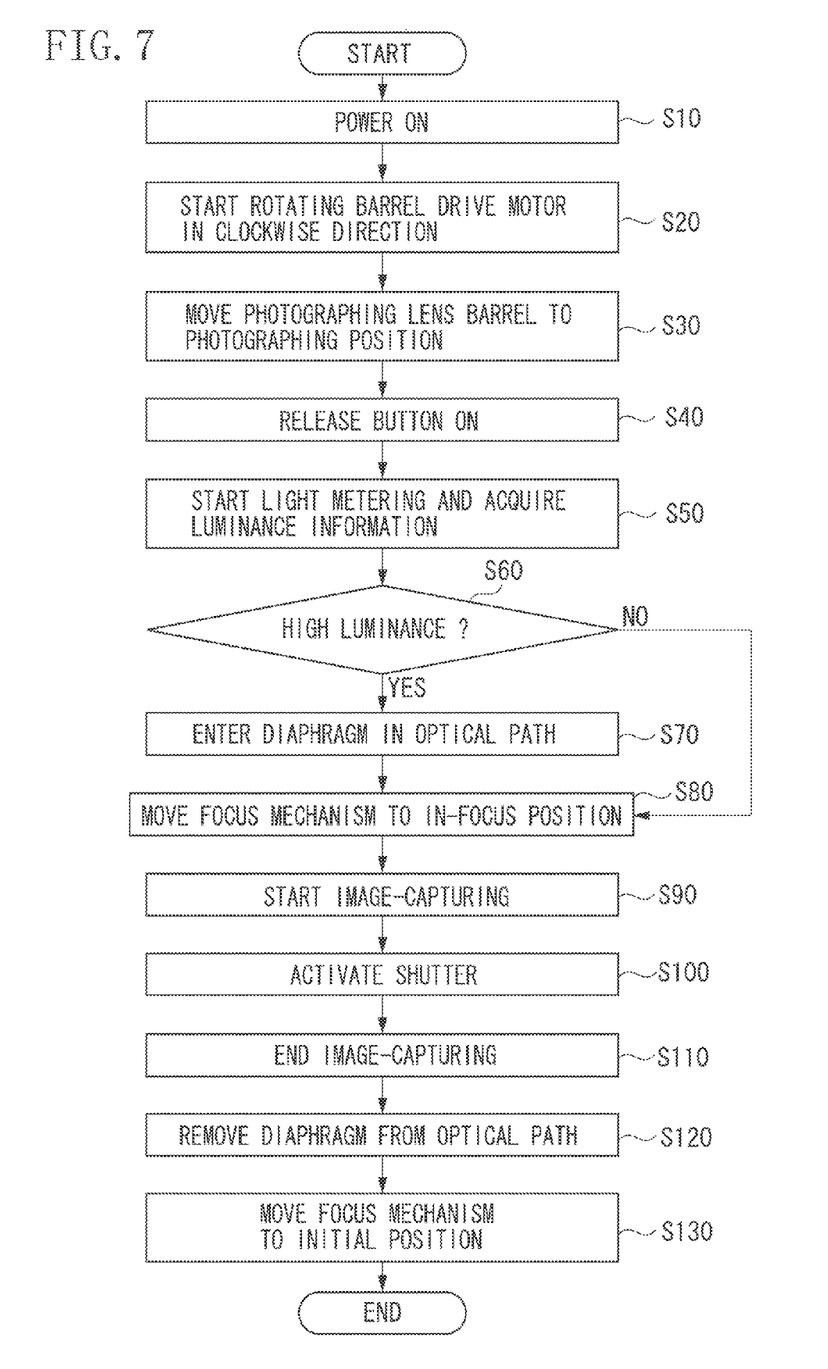
FIG. 7 is a flowchart illustrating a sequence performed when a digital camera, i.e., the imaging apparatus including the image stabilizing apparatus, is switched on to capture an image according to an exemplary embodiment of the present invention.

FIG. 7 is a flowchart illustrating a process from when an operator switches on the digital camera to when image capturing is completed. In step S10, the operator switches on the imaging apparatus. In step S20, the CPU 46 gives an instruction to the zoom motor driving unit 30, rotates a barrel driving motor in a clockwise direction, and drives the zoom mechanism 48. In step S30, if the CPU 46 determines that the lens barrel 19 is moved to the photographing position by the driving force of the barrel driving motor, the CPU 46 stops the barrel driving motor. In such a case, the state of the lens barrel 19 changes from the state illustrated in FIG. 1 to the state illustrated in FIG. 2.

In step S40, the operator presses the release button 13. In step S50, the CPU 46 performs photometry and acquires luminance information of the object. In step S60, the CPU 46 determines whether the luminance information acquired in step S50 is higher than a predetermined luminance. If the acquired luminance information is higher than the predetermined luminance (YES in step S60), the processing proceeds to step S70. On the other hand, if the acquired luminance information is lower than the predetermined luminance (NO in step S60), the processing proceeds to step S80. The operation of the diaphragm 34 is thus not performed and is evacuated from the photographing optical path.

In step S70, since the acquired luminance information is higher than the predetermined luminance, the diaphragm 35 is entered into the photographing optical path to change an amount of incident light. In step S80, the CPU 46 causes the focus lens holding member 8 to move to an in-focus position. In step S90, the CPU 46 starts taking in the image. In step S100, the CPU 46 changes the state of the shutter 33 from an open state to a closed state, and cuts off the incident light. In step S110, the CPU 46 ends image-taking. In step S120, the CPU 46 causes the diaphragm 35 to evacuate from the photographing optical path. In step S130, the CPU 46 moves the focus lens holding member 8 to the initial position, and the processing then ends.

According to the present exemplary embodiment, when the state of the camera changes from the state of being used (i.e., the photographable state) to the unused state (i.e., the state in which the lens barrel is retracted), the gap between the first lens holding member 2 and the second lens holding member 4 decreases. However, since the gap between the first lens holding member 2 and the base member 9 increases, the balls 5 are not in contact with the first lens holding member 2 or the base member 9.

As a result, it becomes less likely for the first lens holding member 2 or the base member 9 to be scratched by the balls 5, and the photographing lens barrel can be thinned when retracted.

A configuration of the image stabilizing apparatus, which is a portion of the lens barrel 19 included in the camera 18, according to a second exemplary embodiment will be described below. According to the second exemplary embodiment, differences from the first exemplary embodiment will be described.

Figure 8:
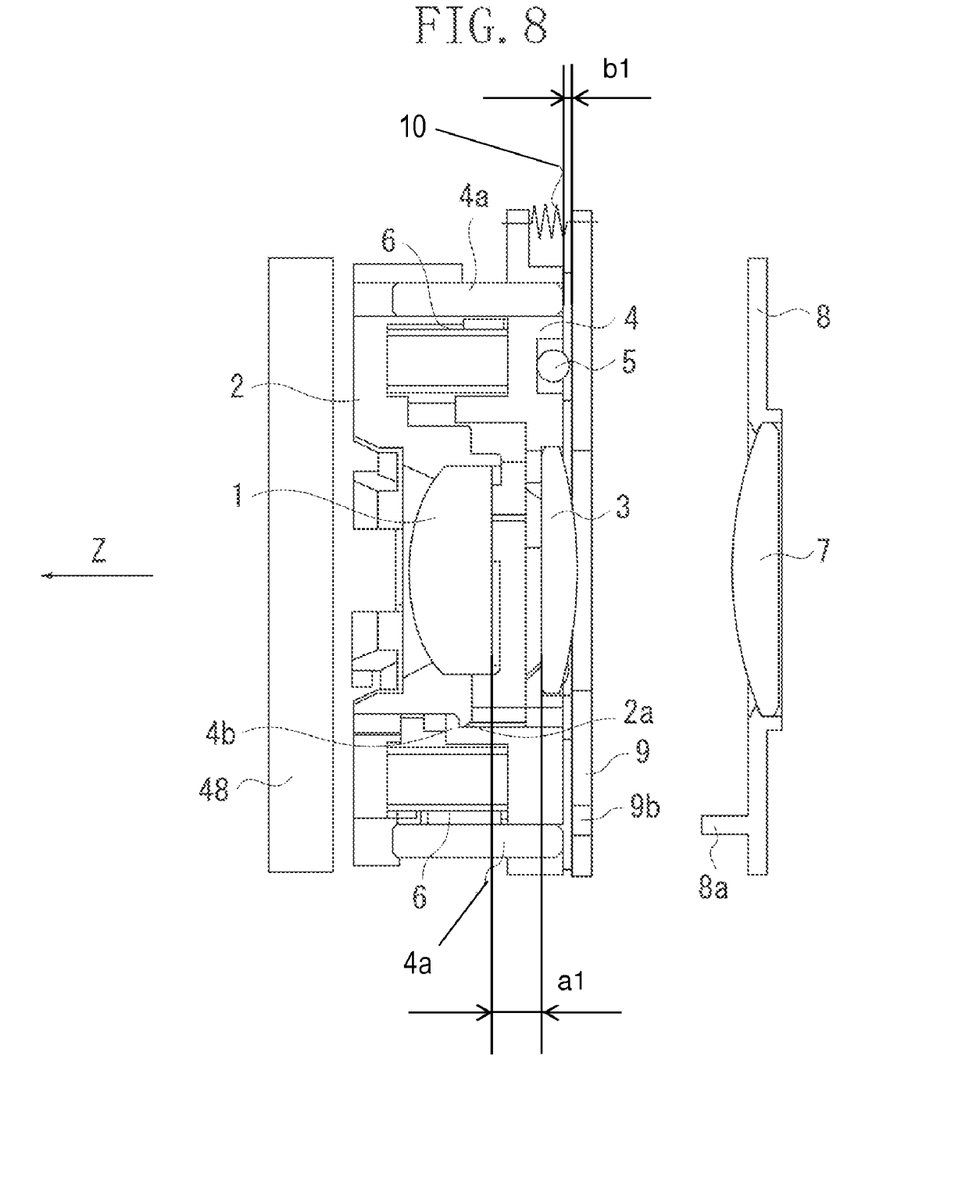
FIG. 8 is a cross-sectional view of the image stabilizing apparatus when the lens barrel in the imaging apparatus is in a photographable state according to a second exemplary embodiment of the present invention.
Figure 9:
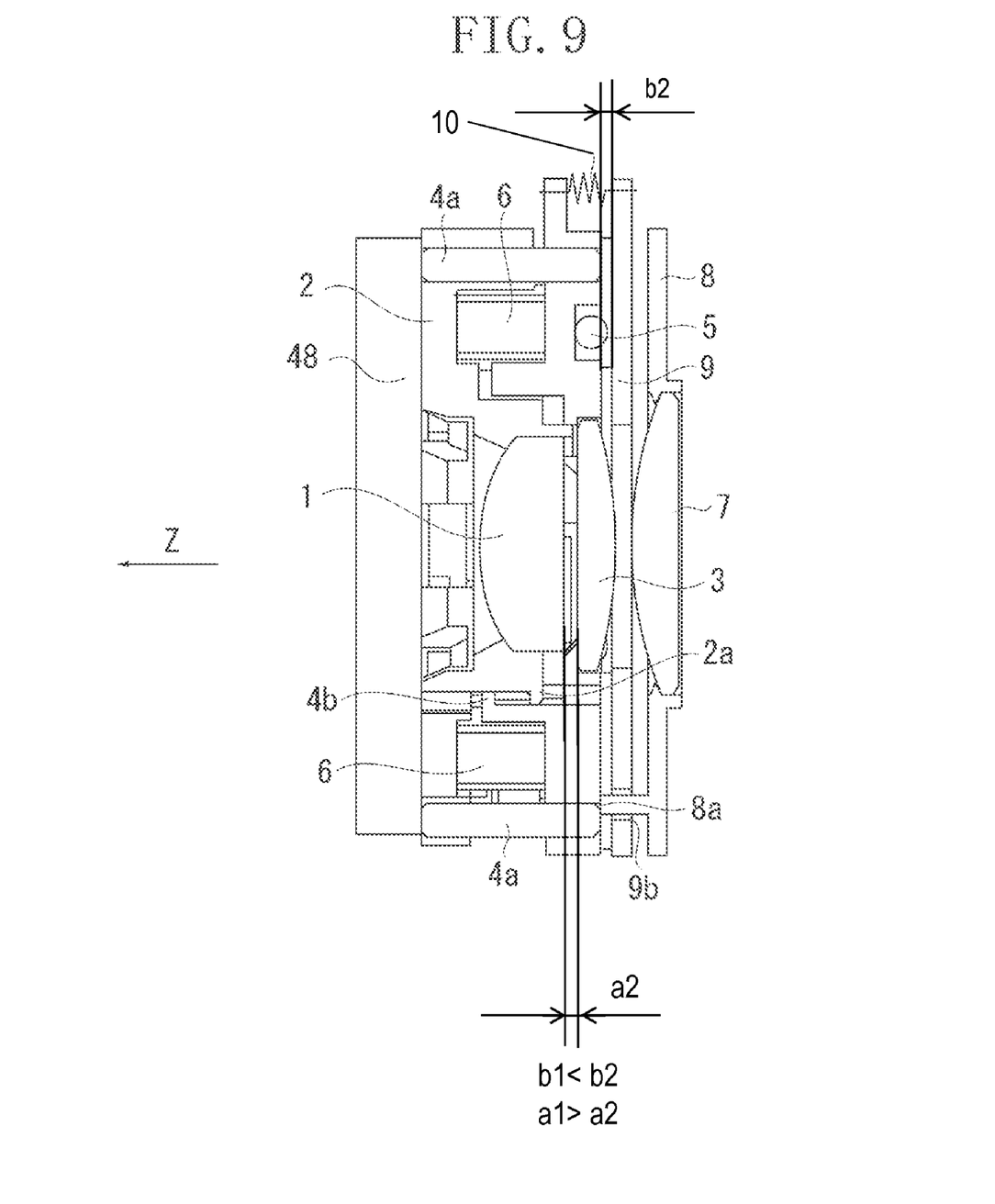
FIG. 9 is a cross-sectional view of the image stabilizing apparatus when the lens barrel in the imaging apparatus is in a retracted state according to the second exemplary embodiment of the present invention.
Figure 10:
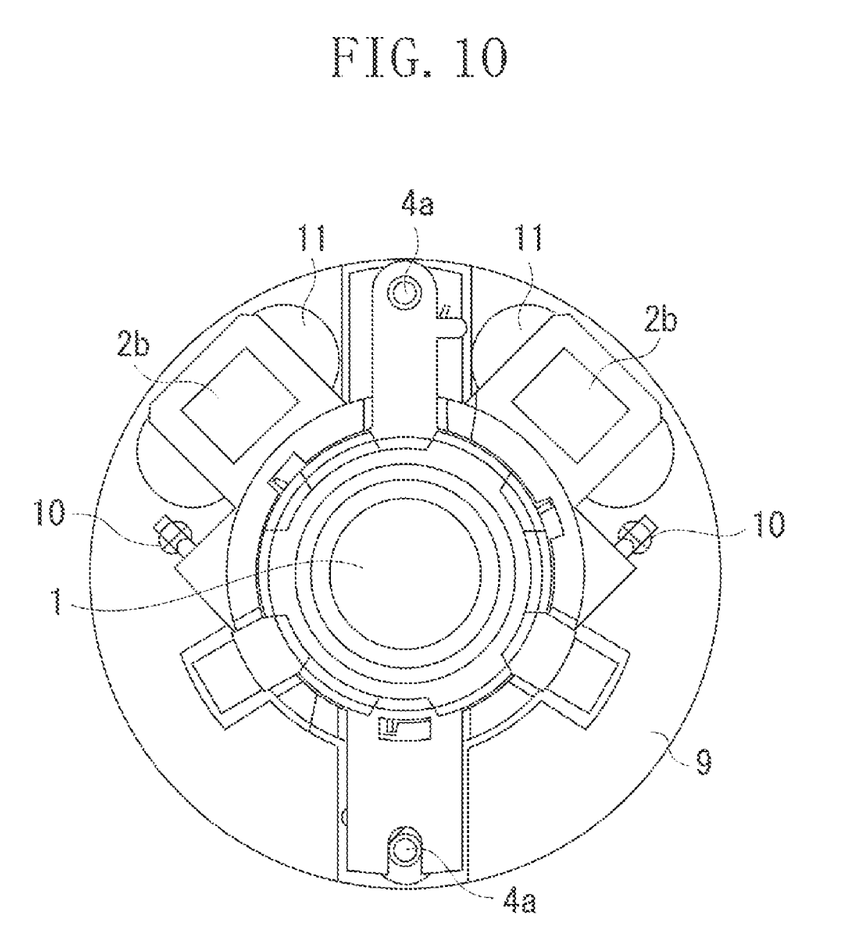
FIG. 10 is a front view illustrating the image stabilizing apparatus according to the second exemplary embodiment of the present invention.
Figure 11:
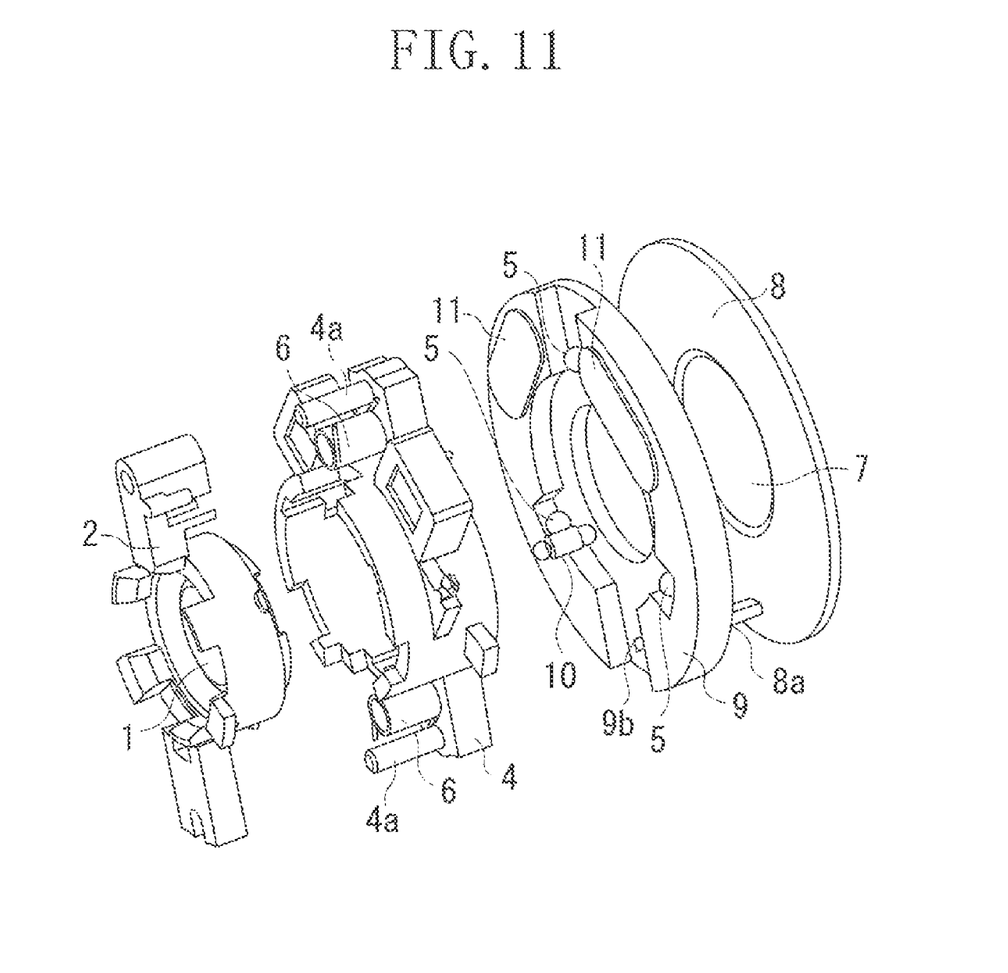
FIG. 11 is an exploded perspective view illustrating the image stabilizing apparatus according to the second exemplary embodiment of the present invention.

FIG. 8 is a cross-sectional view illustrating the image stabilizing apparatus when the camera 18 is in the state of being used (i.e., the lens barrel 19 is in the photographable state). FIG. 9 is a cross-sectional view illustrating the image stabilizing apparatus when the camera 18 is in the unused state (i.e., the lens barrel 19 is retracted). FIG. 10 is a front view, and FIG. 11 is an exploded perspective view illustrating the image stabilizing apparatus in the camera 18 respectively.

The present exemplary embodiment has a configuration to be described below different from the image stabilizing mechanism according to the first exemplary embodiment. The balls 5, i.e. rolling members, are arranged in three positions on the front side (z-positive side) of the base member 9, and the second lens holding member 4 is arranged to sandwich the balls 5 between the base member 9.

Further, the spring 10 (i.e., a second biasing member) is latched and bridged over the base member 9 and the second lens holding member 4. The second lens holding member 4 is thus biased towards the base member 9 by the spring 10, i.e., the biasing member. According to the present exemplary embodiment, the spring 10 is a tension spring. However, any spring may be used as long as the second lens holding member 4 is biased towards the base member 9.

The first lens holding unit 2 locks and holds the first lens 1, and the second lens holding unit 4 similarly locks and holds the second lens 3. Further, magnets 2b are fixed on the second lens holding member 2 at positions opposing coil units 11 on the base member 9.

The first lens holding member 2 and the second lens holding member 4 are connected by the second connecting unit 4b of the second lens holding member 4 abutting the first connecting unit 2a of the second lens holding member 4. The first lens holding member 2 and the second lens holding member 4 are thus approximately integrated to be movable in the optical axis direction.

The spring 6, i.e., a first biasing member (also a compression spring according to the present exemplary embodiment), is disposed between the first lens holding member 2 and the second lens holding member 4. The spring 6 applies a force in the direction to widen the gap between the first lens holding member 2 and the second lens holding member 4. When the camera 18 is in the image capturing state, the first connecting portion 2a comes into contact with the second connecting portion 4b, so that the gap between the first lens holding member 2 and the second lens holding member 4 is determined.

When the camera 18 is being used (i.e., in the photographable state), the electric current is applied to the coil units 11 to generate the magnetic force by the above-described configuration. The second lens holding member 4 is then moved within the plane to reduce and correct the image-shake on the image sensor. Further, the first lens holding member 2 relatively moves together with the movement of the second lens holding member 4 and can thus perform image stabilizing.

When the user switches off the camera 18, the state of the camera 18 shifts from the state of being used (photographable state) to the unused state (retracted state). In such a case, the base member 9 moves towards the retracting direction, i.e., towards the image sensor side along the optical axis direction. The contact portion 8a integrally formed on the focus lens holding member 8 then passes through a through-hole 9b of the base member 9, and comes into contact with and presses the second lens holding member 4. The second lens holding member 4 thus moves in the direction to increase the gap between the second lens holding member 4 and the base member 9, and releases the contact with the balls 5.

Further, when the camera 18 is not being used (i.e., the lens barrel is retracted), the first lens holding member 2 comes into contact with the regulating member that regulates the retracted lens position (such as the zoom mechanism 48). The first lens holding member 2 thus shifts to the retracted state. As a result, when the camera 18 is not being used (i.e., the lens barrel is retracted), the photographing lens barrel can be thinned by decreasing the gap between the first lens holding member 2 and the second lens holding member 4.

Further, unnecessary force is not applied to the balls 5, the ball receiving surfaces of the first lens holding member 2, and the base member 9. Sliding surfaces are thus prevented from being scratched.

While the present invention has been described with reference to various exemplary embodiments, it is to be understood that the invention is not limited to these exemplary embodiments, and various variations and modifications may be made without departing from the scope of the present invention.

This application claims priority from Japanese Patent Application No. 2010-001196 filed Jan. 6, 2010, which is hereby incorporated by reference herein in its entirety.

What is claimed is:

1. An apparatus included in a lens barrel that moves between a photographable state and a retracted state, the apparatus comprising:
    a base member;
    a first lens unit which holds a first lens and is movable in a direction perpendicular to an optical axis of the first lens;
    a second lens unit which holds a second lens, is attached to the first lens unit, and is movable in a direction perpendicular to an optical axis of the second lens; and
    a plurality of rolling members which are sandwiched between the base member and the first lens unit in the photographable state,
    wherein a gap between the first lens unit and the second lens unit is adjustable, and
    wherein the gap between the first lens unit and the second lens unit is smaller in the retracted state as compared to the photographable state, and the rolling members do not contact the base member or the first lens unit in the retracted state.

2. The apparatus according to claim 1,
    wherein the first lens unit is positioned on an object side with respect to the base member, and
    wherein the second lens unit is positioned on an image sensor side with respect to the base member.

3. The apparatus according to claim 1,
    wherein the second lens unit is positioned on an object side with respect to the first lens unit, and
    wherein the base member is positioned on an image sensor side with respect to the first lens unit.

4. The apparatus according to claim 3, further comprising:
    a third lens; and
    a third lens unit holding the third lens,
    wherein the third lens unit includes a contact portion that comes into contact with the first lens unit through a through hole in the base member in the retracted state.

5. The apparatus according to claim 1, further comprising a zoom unit holding a zoom lens,
    wherein the zoom unit is disposed in an object side along an optical axis direction with respect to the image stabilizing apparatus, and
    wherein the zoom unit contacts the first lens unit in the retracted state.

6. The apparatus according to claim 2, further comprising a zoom unit holding a zoom lens,
    wherein the zoom unit is disposed in an object side along an optical axis direction with respect to the image stabilizing apparatus, and
    wherein the zoom unit contacts the first lens unit in the retracted state.

7. The apparatus according to claim 3, further comprising a zoom unit holding a zoom lens,
    wherein the zoom unit is disposed in an object side along an optical axis direction with respect to the image stabilizing apparatus, and
    wherein the zoom unit contacts the first lens unit in the retracted state.

8. An imaging apparatus including the apparatus according to claim 1.

9. The imaging apparatus according to claim 8,
    wherein the first lens unit is positioned on an object side with respect to the base member, and
    wherein the second lens unit is positioned on an image sensor side with respect to the base member.

10. The imaging apparatus according to claim 8,
    wherein the second lens unit is positioned on an object side with respect to the first lens unit, and
    wherein the base member is positioned on an image sensor side with respect to the first lens unit.

11. The imaging apparatus according to claim 10, further comprising:
    a third lens; and
    a third lens unit holding the third lens,
    wherein the third lens unit includes a contact portion that comes into contact with the first lens unit through a through hole in the base member in the retracted state.

12. The imaging apparatus according to claim 8, further comprising a zoom unit holding a zoom lens,
    wherein the zoom unit is disposed in an object side along an optical axis direction with respect to the image stabilizing apparatus, and
    wherein the zoom unit contacts the first lens unit in the retracted state.

* * * * *